United States Patent
DiVerdi et al.

(10) Patent No.: US 8,605,095 B2
(45) Date of Patent: Dec. 10, 2013

(54) GENERATING VECTOR OUTPUT FROM A PHYSICAL SIMULATION OF A BRISTLE BRUSH

(75) Inventors: Stephen J. DiVerdi, San Francisco, CA (US); Sunil Hadap, San Jose, CA (US); Darin C. Tomack, Fremont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 675 days.

(21) Appl. No.: 12/790,581

(22) Filed: May 28, 2010

(65) Prior Publication Data

US 2013/0120426 A1    May 16, 2013

Related U.S. Application Data

(60) Provisional application No. 61/323,222, filed on Apr. 12, 2010.

(51) Int. Cl.
*G06T 11/20* (2006.01)
(52) U.S. Cl.
CPC .................. *G06T 11/203* (2013.01)
USPC ........................................... 345/441
(58) Field of Classification Search
USPC ........................................... 345/441
See application file for complete search history.

(56) References Cited

U.S. PATENT DOCUMENTS

| | | | | |
|---|---|---|---|---|
| 5,239,292 A * | 8/1993 | Willan | .......................... | 345/441 |
| 5,347,620 A * | 9/1994 | Zimmer | ........................ | 345/592 |
| 6,373,490 B1 * | 4/2002 | Bendiksen et al. | ........... | 345/441 |
| 7,602,405 B2 * | 10/2009 | Hsu | ................ | 345/629 |
| 2002/0085003 A1 * | 7/2002 | Nagashima | .................... | 345/441 |
| 2007/0216684 A1 * | 9/2007 | Hsu | ................ | 345/441 |
| 2007/0229526 A1 * | 10/2007 | Hsu | ................ | 345/581 |
| 2007/0268304 A1 * | 11/2007 | Hsu | ................ | 345/592 |
| 2011/0193869 A1 * | 8/2011 | Perani et al. | .................. | 345/582 |

* cited by examiner

*Primary Examiner* — Javid A Amini
(74) *Attorney, Agent, or Firm* — Wolfe-SBMC

(57) ABSTRACT

A method, system, and computer-readable storage medium are disclosed for simulating bristle brush behavior and generating vector output from such simulations. User input may represent a stroke made by a paint brush comprising multiple bristles sweeping across a canvas. A vector representation of the brush stroke's effects may be generated by, for each of the plurality of bristles: determining a path along which the bristle has swept, and generating a vector representation of the path along which the bristle has swept (e.g., a set of Bézier curves, or straight line segments). The vector representation of the effects of the brush stroke may comprise the vector representations of the paths along which each of the plurality of bristles has swept. The vector representations of the paths of each bristle sweep may be composited over each other in an image editing application to depict the brush stroke for display and/or for printing.

19 Claims, 12 Drawing Sheets

GENERATING VECTOR OUTPUT FROM A PHYSICAL SIMULATION OF A BRISTLE BRUSH

PRIORITY INFORMATION

This application claims benefit of priority of U.S. Provisional Application Ser. No. 61/323,222, entitled "System and Method for Generating Vector Output From a Physical Simulation of a Bristle Brush" and filed Apr. 12, 2010, the content of which is incorporated by reference herein in its entirety.

FIELD OF THE DISCLOSURE

This disclosure relates generally to computer systems; and more particularly, it is directed to the simulation of brushes for deposition of paint or ink onto a virtual canvas using computer systems, and the generation of vector output representing the effects of a bristle brush stroke.

BACKGROUND

Description of the Related Art

Digital image editing is the process of creating and/or modifying digital images using a computer system. Using specialized software programs, users may manipulate and transform images in a variety of ways. These digital image editors may include programs of differing complexity, such as limited-purpose programs associated with acquisition devices (e.g., digital cameras and scanners with bundled or built-in programs for managing brightness and contrast); limited editors suitable for relatively simple operations such as rotating and cropping images; and professional-grade programs with large and complex feature sets.

Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values. Vector graphics data may be stored and manipulated as one or more geometric objects built with geometric primitives. The geometric primitives (e.g., points, lines, paths, polygons, Bézier curves, and text characters) may be based upon mathematical equations to represent parts of vector graphics data in digital images. The geometric objects may typically be located in two-dimensional or three-dimensional space. A three-dimensional object may be represented in two-dimensional space for the purposes of displaying or editing the object.

An operation often provided by a digital image editor is the use of a virtual "paintbrush" (also referred to herein as a "brush" or a "brush tool") to modify a digital image by depositing virtual paint or virtual ink. Various prior approaches have attempted to model a real-world brush and its behavior in the context of such an operation. For example, a two-dimensional (2D) raster image may be created to represent the shape of the brush as it contacts the canvas, and the 2D image may be stamped repeatedly along the input path. In another approach, a vector representation of the brush tip has been used instead of a 2D raster image. In some systems, a brush tip is represented as a single triangle mesh. However, undesirable artifacts may be created by these approaches, particularly when the stamping rate is not sufficiently high.

Digital painting applications by and large focus on raster output, i.e. they typically generate brush strokes in terms of pixels, which are then used to update documents that are made up of arrays of pixels. Vector editing applications are typically restricted to very basic types of brush tools that generate a simple flat-filled path to represent the stroke of a paintbrush.

SUMMARY

The systems and methods described herein may be used to generate complex vector output from a physical simulation of a bristle brush that retains the organic appearance of the brush stroke texture while maintaining the editability and resolution-independence features of vector data. In such systems, rather than computing pixel data to represent a brush stroke, the system may generate a vector representation of stroke data using a brush model. For each bristle of the brush model, the system may be configured to create a filled vector region representing the area covered (or swept) by that bristle during a brush stroke. In addition to editability and resolution-independence, such a vector representation may exhibit other advantages over raster representations, such as compactness.

In some embodiments, the system and methods described herein may be used to determine the effect of each of the bristle representations on an image throughout the motion of a brush stroke. In one embodiment, a continuous stroke may be determined for each of a plurality of bristle representations (e.g., between the first simulation step and the second simulation step). In one embodiment, an approximation of a volume swept by each bristle representation between the first simulation step and the second simulation step may be determined. The approximation of the volume may be represented by a quadrilateral comprising the end points of the portion of the respective bristle link contacting the canvas at the first simulation step and the second simulation step. The image may be modified based on the determined effect of each of the plurality of bristle representations on the image.

In some embodiments, the system and methods described herein may be used to compute and store a vector representation of the effect on the image produced by each bristle of a virtual brush during a brush stroke. In such embodiments, the collection of these vector representations may be composited to represent the effect of the brush stroke for display and/or for printing.

Figure 1:
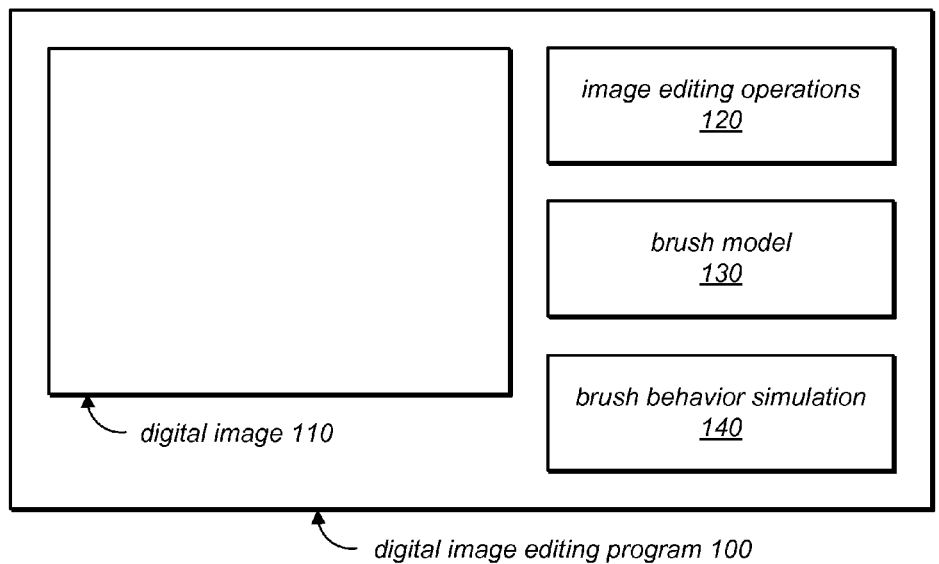
FIG. 1 is a block diagram illustrating one embodiment of a digital image editing program configured for the simulation of brushes.

The specific embodiments described herein and shown by way of example in the drawings are susceptible to various modifications and alternative forms. It should be understood, therefore, that drawings and detailed description thereto are not intended to be limited to the particular form disclosed, but on the contrary, the disclosure is to cover all modifications, equivalents and alternatives falling within the spirit and scope as defined by the appended claims.

DETAILED DESCRIPTION OF EMBODIMENTS

Some physical simulations of brush bristles rely on the generation of pixel data to achieve natural looking strokes and/or complex texture effects. In such systems, many overlapping transparent pixels may create nice smooth gradients around the edges of the brush stroke, and modulation with canvas grain data may create rough textured appearances within the stroke. However, these effects may all be difficult to reproduce in a vector format (such as the filled Béziers and gradients of Adobe Illustrator®) because of their complex topology and structure. For example, raster output may allow structures to be defined implicitly, whereas vector output may require that the structure be explicitly generated. The systems and methods described herein may automatically generate vector structure from a bristle brush simulation in a way that reproduces the same complex appearance of raster data's implicit structure.

Digital painting applications by and large focus on raster output—i.e. they generate strokes in terms of pixels, which are then used to update documents that are arrays of pixels. Vector editing applications are typically restricted to very basic types of brush tools that generate simple flat-filled paths having a plain appearance to represent the strokes of a paint brush. The systems and methods described herein may in some embodiments be used to generate complex vector output from a physical simulation of a bristle brush that retains the organic appearance of the brush stroke texture while maintaining the editability and resolution-independence features of vector data.

In some systems, a brush tip is represented as a single triangle mesh, and brush strokes are simulated by stamping this one, large stamp along a trajectory. However, such a whole-brush stamp may not produce realistic looking effects, since it does not mimic the behavior of an actual bristle brush (e.g., one with a dense set of bristles near the center of the brush and fewer bristles around the periphery). The systems and methods described herein may be used to create vector output from a physical simulation of a bristle brush, and may enable a uniquely expressive and generative type of natural media painting not previously available in vector applications.

As noted above, vector graphics representations of a brush stroke may afford several significant advantages over raster representation in terms of resolution-independence, compactness, and editing capabilities. For example, vector representations of brush strokes may be created, scaled, rotated or flipped very easily, and without intensive recomputation of a large number of pixel values. Similarly, interactive retouching operations (such as recomputing a stroke from the same trajectory using a different brush or different pressure data) may be relatively straightforward when the brush stroke is represented by vector data. Moreover, in some embodiments, when a vector representation of a brush stroke is employed, the outline of the stroke may be accessible to the user and may be edited like any other shape outline. In addition, because the vector representation of the brush is resolution-independent, it may be displayed and/or printed at any size without regenerating the representation, and without loss of detail.

The description that follows includes a discussion of a brush stroke model representing a bristle brush, and physical simulations of bristle brushes, as well as descriptions of various embodiments of systems and methods for generating vector output from such simulations.

Using embodiments of the systems and methods described herein, realistic brush behavior may be simulated in a painting application. In one embodiment, the brush behavior may be simulated substantially in real-time to deposit ink or paint onto a virtual canvas. A brush model may include a large set of discrete bristles. The bristles may comprise "virtual" bristles and may also be referred to herein as bristle representations. The simulated behavior of the brush may result in continuous strokes created by sweeping individual bristles into quadrilaterals. The brush model and brush behavior simulation may model the change of the shape of a brush tip during a stroking motion and the deposition of paint or ink resulting from the motion. By computing the effect of each bristle independently of other bristles, a faithful reproduction of how a real brush deposits paint or ink and changes shape during a stroke may be achieved.

FIG. 1 is a block diagram illustrating an embodiment of a digital image editing program 100 configured for use with the brush simulation techniques described herein. A digital image editing program 100, also referred to herein as an image editor 100, may be used to create and/or modify a digital image 110, also referred to herein as an image 110. The digital image editing program 100 may comprise a plurality of editing operations 120. The editing operations 120 may comprise suitable operations for modifying elements of the image 110. For example, various effects such as filters (e.g., Gaussian blur, median filter, add noise, reduce noise, fragment, unsharp mask), image adjustments (e.g., levels, curves, brightness/contrast, shadow/highlight), and other operations (e.g., resizing, cropping, thresholding, rotation, perspective distortion) may be applied to one or more images, selections within the image 110, or other suitable data related to the image 110. In one embodiment, a suitable product such as Adobe Photoshop®, Adobe Illustrator®, or Adobe AfterEffects® (available from Adobe Systems, Inc.) may be used as the image editor 100.

Using the image editor 100, a user may seek to apply pixel values (also referred to herein as "paint" or "ink") such as pixel colors and alpha (e.g., transparency) values to the digital image 110. For example, the user may desire to paint portions of the image 110 using a paintbrush provided by the editing operations 120 of the image editor 100. The digital image editing program 100 may comprise a brush model 130 that is used to model such a paintbrush. The digital image editing program 100 may also comprise instructions to implement brush behavior simulation functionality 140. As will be described in greater detail below, the brush behavior simulation functionality 140 may comprise one or more operations to simulate behavior of a paintbrush. The brush behavior simulation functionality 140 may use the brush model 130.

Figure 2:
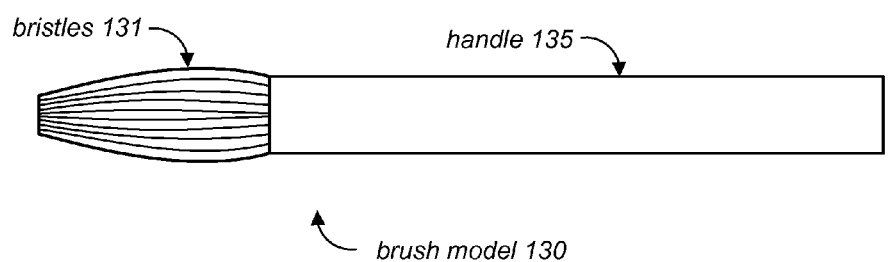
FIG. 2 is a block diagram illustrating a brush model, according to one embodiment.

FIG. 2 is a block diagram illustrating a simplified brush model according to one embodiment. In one embodiment, a brush may be simulated as a set of discrete "virtual" bristles. As shown in FIG. 2, the brush model 130 may comprise a plurality of bristles 131. The plurality of bristles 131 may also be referred to herein as bristle representations 131. In one embodiment, the brush model may also comprise a brush handle 135. The brush handle 135 may also be referred to herein as a brush handle representation 135. The plurality of bristles 131 may be attached to the end of the handle 135. In one embodiment, the bristles 131 may include a sufficient number of individual bristles (e.g., 50 to 100) for accurate simulation of the behavior of a real brush.

Figure 3:
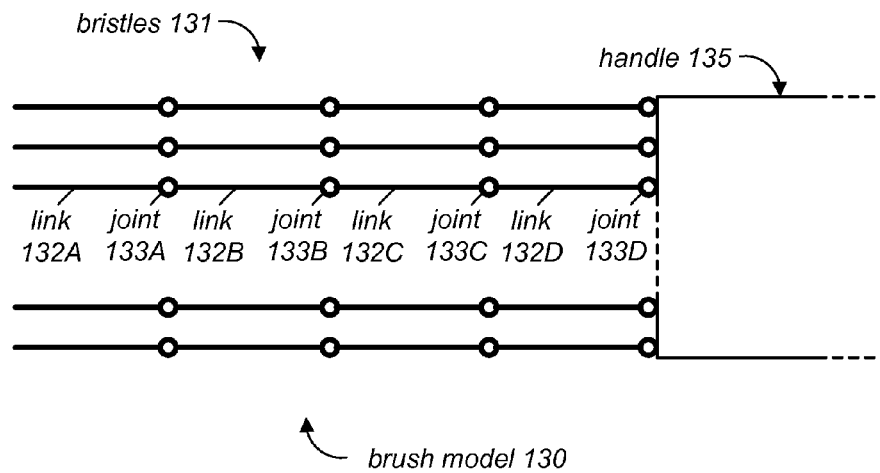
FIG. 3 is a block diagram further illustrating a brush model, according to one embodiment.

FIG. 3 is a block diagram further illustrating a brush model according to one embodiment. Each bristle may comprise a series of links. Each link may comprise a thin cylinder such as a cylinder having a minimal (e.g., nearly zero) radius. The links in a bristle may be connected end-to-end. The connections between links may comprise ball-and-socket joints. The connections between the handle 135 and the first link in each bristle may also comprise ball-and-socket joints. The ball-and-socket joints may permit arbitrary rotational movement with three degrees of freedom (3DOF). As shown in the example of FIG. 3, one bristle may comprise a set of links 132A, 132B, 132C, 132D. The links 132A, 132B, 132C, 132D may be connected to each other by ball-and-socket joints 133A, 133B, 133C. The bristle may be connected to the brush handle 135 by an additional ball-and-socket joint 133D. In one embodiment, the number of links in a bristle may control the size of curves that the bristle can form, where the size is proportional to the length of the bristle. Tighter curves may be possible with more links, and smoother shapes may be typical with fewer links. Because "real world" brush bristles generally do not form tight curves or small loops, few links may be used for each bristle in one embodiment.

In one embodiment, motion of the brush model 130 may be determined using standard articulated rigid body dynamics with hard constraints. Thus, for each object being simulated (e.g., each link or handle), the motion may be computed as a six-degrees-of-freedom (6DOF) rigid body which is subject to the constraints imposed by the joints between objects. A real brush bristle tends to resist deformation by exerting force to restore its shape at rest (i.e., a rest shape). To simulate the stiffness of a brush bristle, each joint in the brush model 130 may exert some force. The rest shape of the bristle may be defined in terms of the rest angles of each joint. For a straight bristle, for example, each angle may be set to zero. Joint limits may be used to restrict the valid angles of each joint to zero, and a stiff constraint force may be used to restore the joint limits. Because brush bristles are a classic stiff dynamic system comprising large forces that change quickly, an implicit solver may be used to ensure stability in one embodiment.

Figures 4A, 4B:
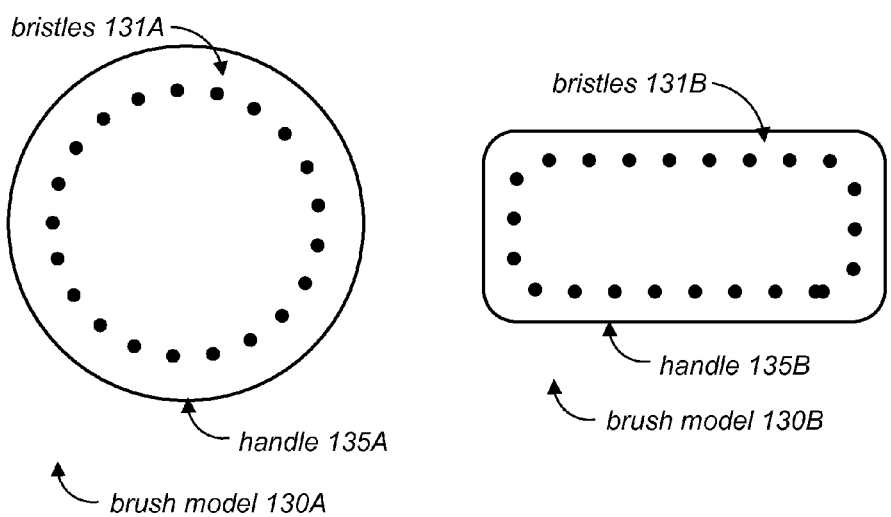
FIGS. 4A and 4B are block diagrams illustrating examples of brush models, according to various embodiments.

Different types of brushes may be simulated by varying the parameters of the brush model 130. The parameters of the brush model 130 may be altered to generate different bristle materials, different configurations (e.g., arrangements) of bristles, and different types of brush deformation behavior (e.g., bristle splitting, bristle bending, etc.). FIGS. 4A and 4B are block diagrams illustrating examples of different brush types according to one embodiment. For example, a standard round brush may have bristles distributed within a circle on the handle, with the bristles in the same direction and with a tapered end. The brush model 130A shown in FIG. 4A may simulate this circular arrangement of bristles 131A attached to a handle 135A. A flat brush may have a rectangular cross section with bristles of the same length. The brush model 130B shown in FIG. 4B may simulate this arrangement of bristles 131B attached to a rectangular handle 135B. A fan brush may distribute its bristles across an arc with radial direction and uniform length. Additionally, different bristle materials (e.g., camel hair, badger, red sable, nylon, etc.) may be simulated by changing the stiffness of each joint along the bristle. For example, some fiber types may be more stiff overall, and others may be stiff at the base but become less stiff towards the tip.

In one embodiment, the brush model 130 may be used in the simulation of brush behavior (using the brush behavior simulation functionality 140). The shape formed by the bristles in contact with the canvas may be referred to as a brush contact shape. In general, the simulation of brush behavior may include sweeping the two-dimensional (2D) image of the brush contact shape along a 2D curve defined by the motion of the brush between simulation steps. Using prior approaches to create the swept area, the 2D image was stamped at substeps along the curve to approximate the solution for a number of substeps determined by a sampling rate. Use of the brush behavior simulation functionality 140 may substantially avoid the sampling artifacts found in some prior approaches which apply a stamp along a path.

In one embodiment, continuous brush strokes may be created between discrete simulation steps using the brush model 130 discussed above. Because each bristle is simulated as a series of links, the swept volume of a bristle (i.e., the volume swept by a bristle during a stroke) may be computed as the sum of the swept volumes of each link. Each link may comprise a thin cylinder that can be approximated by a line. The swept volume of the thin cylinder may be orthographically projected into 2D to determine the final canvas mark. Therefore, instead of sweeping a cylinder to generate a volume, the final mark may be approximated by sweeping a line for each cylinder to generate a quadrilateral (also referred to herein as a quad).

To sweep a line into a quad, the quad may be constructed by connecting the end points of the beginning line segments and the end points of the ending line segments. Each quad may then be orthographically projected to the canvas plane to create the final mark. To simulate the portion of each bristle that is in contact with the canvas, a height threshold may be used to clip the portion of each bristle that is not in "contact" with the canvas (i.e., above the height threshold). Using this clipping technique, the behavior of pushing the brush harder into the canvas to create a larger mark may be simulated.

Figure 5A:
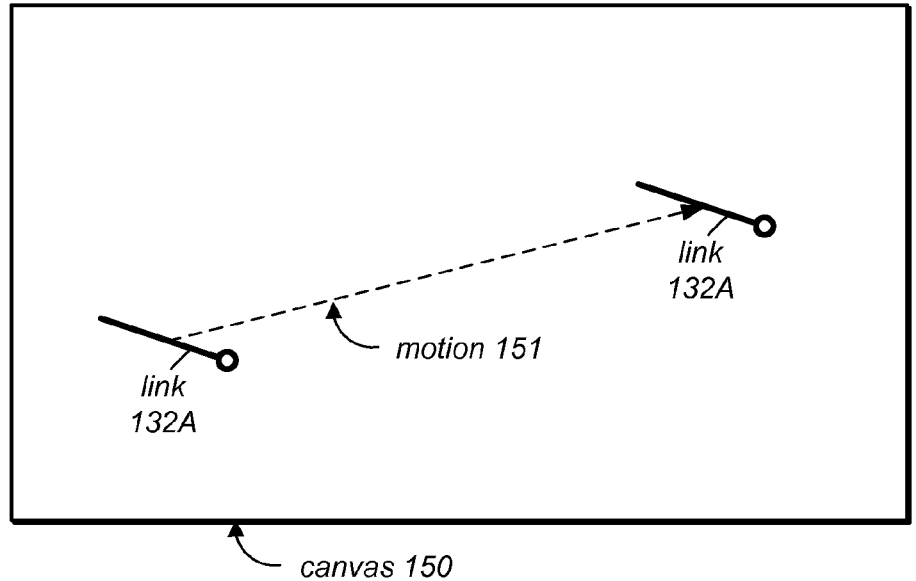
FIGS. 5A and 5B are block diagrams illustrating examples of a brush behavior simulation, according to one embodiment.
Figure 5B:
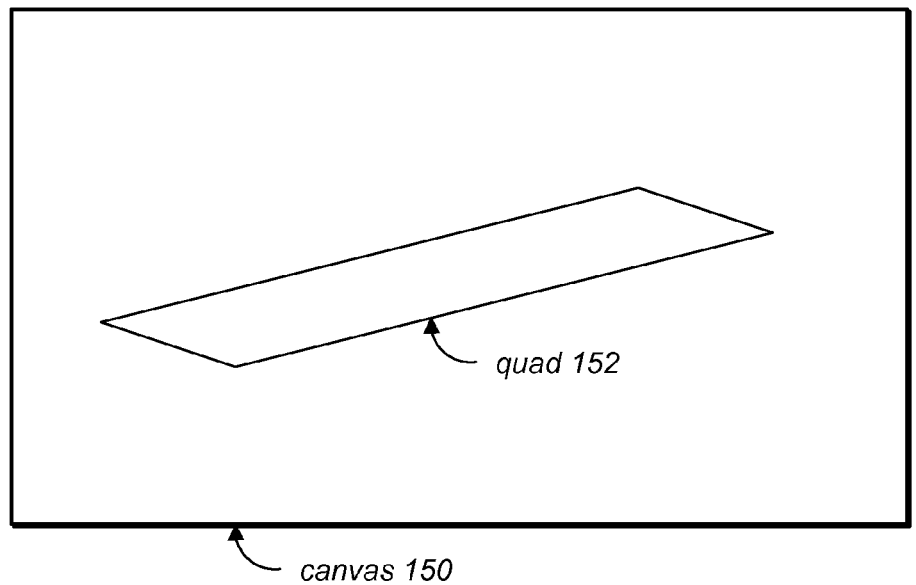

FIGS. 5A and 5B are block diagrams illustrating an example of the brush simulation according to one embodiment. FIG. 5A shows a link 132A of a bristle in "contact" with a canvas 150. The canvas 150 may represent a portion of a larger canvas. The canvas 150 is "painted" by moving the link 132A according to a particular motion 151. The two instances of the link 132A may correspond to two steps in a brush simulation. In the example shown in FIG. 5A, the entire link 132A is in contact with the canvas at both the beginning and end positions. FIG. 5B illustrates the quad 152 that is generated by the motion of the link 132A in contact with the canvas. The quad 152 may be generated by connecting the endpoints of the line segment corresponding to the link as it contacts the canvas at the two positions. A mark (also referred to as "paint" or "ink") corresponding to the quad 152, including one or more pixels with appropriate color and transparency values, may be generated in a corresponding location in the digital image 110. By generating a quad and a corresponding mark in this manner for every link in every bristle that contacts the canvas, continuous brush strokes may be created between discrete simulation steps using the brush model 130. In one embodiment, the same region of the canvas may be stroked more than once to simulate a buildup of paint or ink that results in a darker color than a single stroke.

In one embodiment, the approximation of a bristle's swept area may be inaccurate if a quadrilateral corresponding to a nearly vertical bristle is too thin to leave a mark because no pixels are hit by the projection onto the canvas. To account for this potential inaccuracy, a line segment having a width of one may be rasterized for each bristle between the end points of the bristle's last link. In this manner, each bristle in contact with the canvas may be guaranteed to make a minimum thickness mark (e.g., a mark of at least one pixel) under any deformation. Although the resulting additional pixel along the edge of the brush's mark may be incorrect when the bristle is not vertical, the error may be too small to affect the final output mark significantly.

Appropriate user input may be captured in connection with the brush behavior simulation functionality 140. For example, the user input may include a selected brush type as well as the position of the brush and the direction of its movement relative to a canvas. The user input may also include a "pressure" value that may be captured with an appropriate input device such as a digitizing tablet and/or stylus. The input pressure may be used to simulate the pressure applied to the brush. Using the brush model 130 and brush behavior simulation 140 discussed above, the input pressure may be used to deform the bristles 131 into a wide range of shapes in contact with the canvas. The shape of the brush tip may change throughout a stroke as the input pressure changes.

Figure 6:
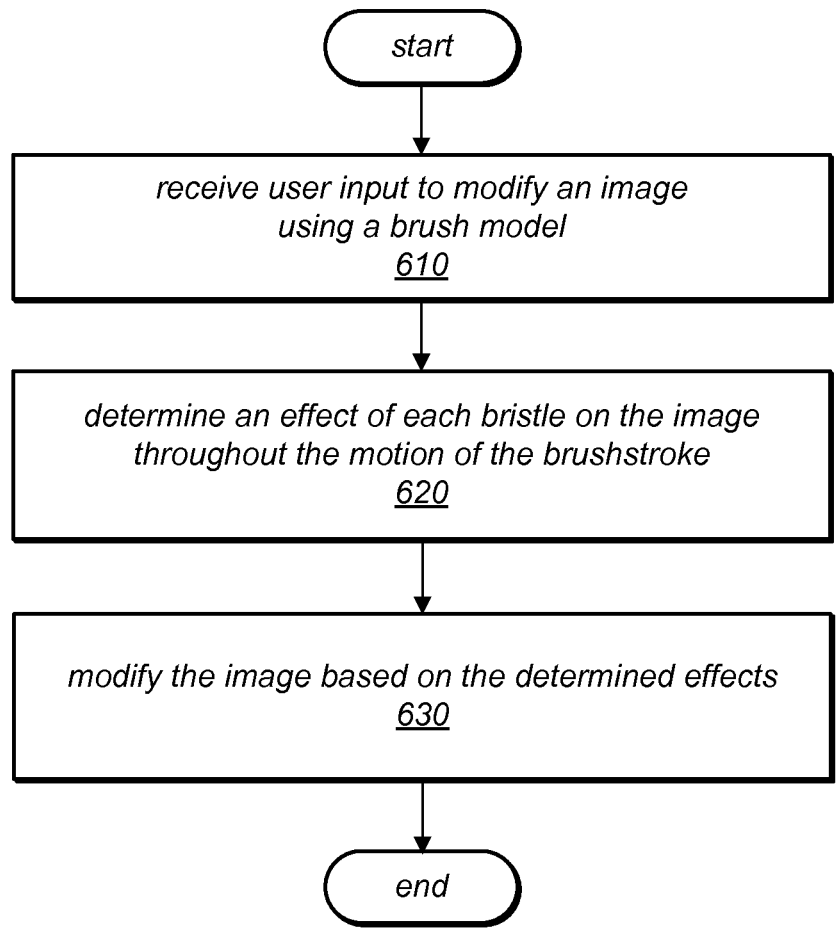
FIG. 6 is a flow diagram illustrating a method for simulating brush behavior, according to one embodiment.

FIG. 6 is a flowchart illustrating a method for simulating brush behavior according to one embodiment. As shown in 610, user input may be received to modify an image using a brush model. As discussed above, the brush model may comprise a plurality of bristle representations, and each bristle representation may comprise a series of one or more links. The user input may comprise a motion of the brush model, such as a motion between a first position (e.g., at a first simulation step) and a second position (e.g., at a second simulation step). The user input may also comprise one or more paint values representing a color of the "paint" or "ink" sought to be applied.

As shown in 620, an effect (if any) of each of the plurality of bristle representations on the image throughout the motion may be determined. In one embodiment, a continuous stroke may be determined in 620 for each of the plurality of bristle representations between the first simulation step and the second simulation step. In one embodiment, an approximation of a volume swept by each bristle representation between the first simulation step and the second simulation step may be determined in 620. In one embodiment, a clipping operation may be used in 620 to determine a portion of the plurality of the bristle representations located between a canvas and a plane above the canvas.

In one embodiment, a set of the links that contact the canvas in the first simulation step and the second simulation step may be determined in 620. A quadrilateral may be determined for each link in this set of links. The quadrilateral may comprise the end points of the portion of the respective link contacting the canvas at the first simulation step and the second simulation step. The effect of the paint in each quadrilateral may then be determined.

As shown in 630, the image may be modified based on the determined effect of each of the plurality of bristle representations on the image throughout the motion. For example, color values of pixels affected by the stroke of the brush may be modified. In one embodiment, each bristle representation in "contact" with the canvas may affect at least one pixel along its path from the first simulation step to the second simulation step.

In one embodiment, a suitable simulation engine such as the Open Dynamics Engine (ODE) may be used to implement the brush model 130 and/or brush behavior simulation 140 discussed above. ODE may comprise a framework for constrained dynamics simulations. Using ODE, each of the bristles 131 may be modeled as a chain of rigid capped cylinders (e.g., capsules) connected end-to-end by rotational joints, with each bristle attached at one end to the brush handle 135. The joints may be modeled as 3DOF ball-and-socket joints. The canvas 150 may be modeled with a single plane. The bristles 131 may collide with the plane of the canvas during a stroke, and the collision may cause the brush tip to deform. The user input may be used to generate the brush position with an explicit restorative force computed at each timestep. Given the target pose (e.g., position and orientation), the force and torque needed to change the brush's current pose and momentum to the target pose may be computed directly. The computer force and torque may be applied as external forces using the simulation engine (e.g., ODE).

Restorative forces may be used in the modeling of bristles that attempt to return to a rest shape. In one embodiment, joint limits may be specified using the simulation engine (e.g., ODE) for the modeling of restorative forces. Start and stop angles may be specified for each joint using the simulation engine (e.g., ODE). By setting all the angles to the same value, the effect of a rest angle may be created. The constraint force mixing (CFM) and error reduction parameter (ERP) for a joint may be set to yield behavior equivalent to a spring-damper system, and a force limit may keep the joint from adding too much energy to the simulation at once. In simulating a spring-damper system, the forces may be integrated implicitly so that stiff bristle behavior may be simulated in real-time.

In one embodiment, explicit angular spring forces may be specified using the simulation engine (e.g., ODE) for the modeling of restorative forces. Start and stop angles may be specified for each joint using the simulation engine (e.g., ODE). By setting all the angles to the same value, the effect of a rest angle may be created. The pose of the links may be used to compute the angular spring torques manually after each simulation step. The angular spring torques may then be applied to the links as external forces.

The simulation engine (e.g., ODE) may be used to implement a constrained dynamics simulation. A constrained dynamics simulation may solve for constraint forces by creating an N·N matrix, where N is the number of degrees of freedom that are constrained. For bodies called islands that do not have constraints between them and do not interact, the matrix may be split into separate matrices for each island. Each matrix may be solved independently for a particular island. Because solving the matrix may be a problem of complexity $O(N^3)$, solving islands separately may typically be faster than solving the same bodies as one interrelated system. Therefore, the simulation of the brush behavior may be more computationally efficient if the brush bristles are separated so they are independent of one another.

As discussed above, each bristle may be connected by a joint to the same brush handle 135. However, because the handle mass may be large in comparison to the bristle mass, the error in brush pose for each frame may be very small. Thus, the brush handle 135 may be modeled as many separate brush handle bodies using the simulation engine (e.g., ODE). Each bristle may be attached to one of the separate brush handle bodies using a ball-and-socket joint. Although the computation of the force and torque necessary to move a brush handle may be performed separately for each brush handle body, such a computation is relatively inexpensive. The separation of the bristles permitted by the use of multiple brush handle bodies may permit each bristle to be solved independently. Therefore, the brush behavior simulation 140 may be both computationally efficient and scalable in a multi-processor or multi-core environment. In one embodiment, for example, 40 bristles may be simulated at 60 Hz on one core; alternatively, 75 bristles may be simulated at 30 Hz on one core.

In one embodiment, inter-bristle forces may be simulated. By including bristle-to-bristle collisions, contact joints between bristles may be created to enforce penetration constraints. By simulating inter-bristle forces, the bristles may spread and appear to maintain the volume of the brush tip more naturally when pressed into the canvas. In one embodiment, an approximation of the inter-bristle forces may be included in the brush behavior simulation 140 to achieve similar effects in a more computationally efficient manner. For example, explicit penalty forces may be added to provide similar bristle-to-bristle collision behavior without the need for additional constraints.

In one embodiment, the simulation engine (e.g., ODE) may provide various of mechanisms for enforcing constraints in the simulation. One constraint enforcement mechanism may be referred to as dWorldStep. The dWorldStep functionality may be used to construct and solve the constraint matrix in $O(N^3)$ time. Another constraint enforcement mechanism may be referred to as dWorldQuickStep. The dWorldQuickStep functionality may be used to perform iterative relaxation to approximate the correct constraint forces in $O(M\ N)$ time, where M is the number of iterations (e.g., 20). In one embodiment, the use of dWorldQuickStep in the brush behavior simulation may be faster than the use of dWorldStep. For example, for a 5-link bristle in which each joint is 3DOF, there are 15 constraints. Solving the matrix using dWorldStep may take approximately 3375 (i.e., $15^3$) units of time while solving the approximation using dWorldQuickStep may take approximately 300 (i.e., 15×20) units of time. The relative efficiency of dWorldQuickStep may be even more pronounced when inter-bristle forces are included.

Research in natural media painting has produced impressive images, but those results have not been adopted by commercial applications to date, largely because of the heavy computational demands of industrial painting workflows. As described herein, a new 3D brush model with associated algorithms for stroke generation and bi-directional paint transfer may be suitable even for professional use. The model described herein may in some embodiments reproduce arbitrary brush tip shapes and may be used to generate raster or vector output, none of which was possible in previous simulations. The system and methods described herein may employ an efficient formulation of bristle behaviors as strand dynamics in a non-inertial reference frame. To demonstrate the robustness and flexibility of this approach, it has been integrated it into major commercial painting and vector editing applications and evaluated by professional artists.

The system and methods described herein may be used to reproduce the aesthetically desirable soft edges of natural brush strokes. In some embodiments, this may be achieved in the bristle brush simulation's raster output by rendering separate sweeps (or swaths) of pixels for each bristle atop one another. The difference in the position of each bristle over time may result in different boundaries for each of the sweeps. Therefore, there may be varying levels of overlap at the extremities of the stroke, while the center may maintain a consistent fill. In some embodiments, this behavior may be replicated in vector form by generating a transparent filled path for each bristle. These paths may then overlap in a manner similar to that of the paths of the raster data, with the perimeters having varying levels of opacity and apparently smooth fall-offs. In order to achieve this, the system may be configured to generate a vector path from the motion of a bristle over time, as described herein.

Figure 7:
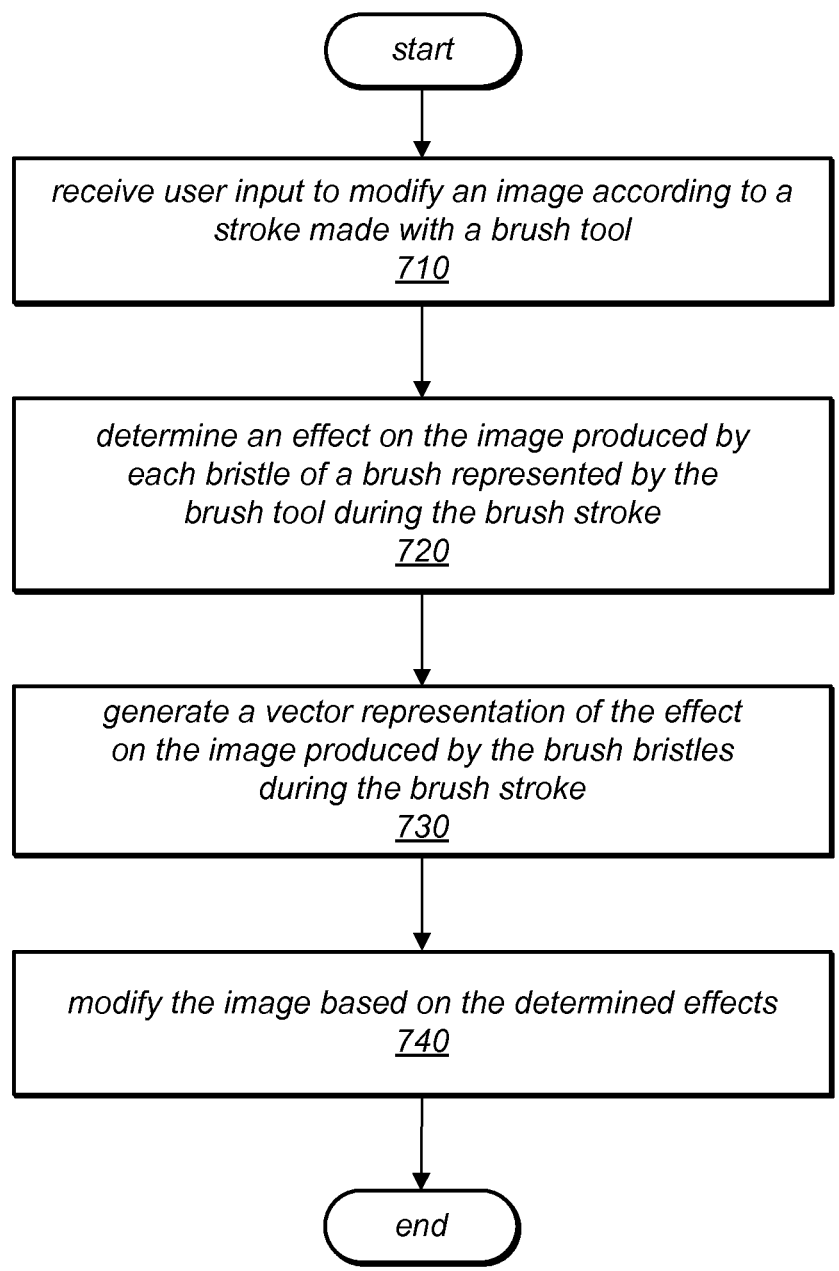
FIG. 7 is a flow diagram illustrating a method for simulating brush behavior and generating vector output from the simulation, according to one embodiment.

FIG. 7 is a flow diagram illustrating a method for simulating brush behavior and generating vector output from the simulation, according to one embodiment. As illustrated at 710 in this example, the method may include receiving user input to modify an image according to a stroke made with a brush tool. As discussed above, the brush model may comprise a plurality of bristle representations, and each bristle representation may comprise a series of one or more links. The user input may comprise a motion of the brush model, such as a motion between a first position (e.g., at a first simulation step) and a second position (e.g., at a second simulation step) using a stylus and/or tablet input device. The user input may also comprise one or more paint values representing a color of the "paint" or "ink" to be applied.

As shown at 720, the method may include determining an effect (if any) produced by each of the plurality of bristle representations on the image during the brush stroke. As described above in reference to FIG. 6, a continuous stroke may be determined for each of the plurality of bristle representations between the first simulation step and the second simulation step, and/or an approximation of a volume swept by each bristle representation between the first simulation step and the second simulation step may be determined. In some embodiments, a clipping operation may be used to determine the portion of the plurality of the bristle representations located between a canvas and a plane above the canvas, as described in more detail below. In other words, at 720, the effect of applying paint to the canvas using the brush stroke may be computed as rasterized data using the methods described above.

Figure 12:
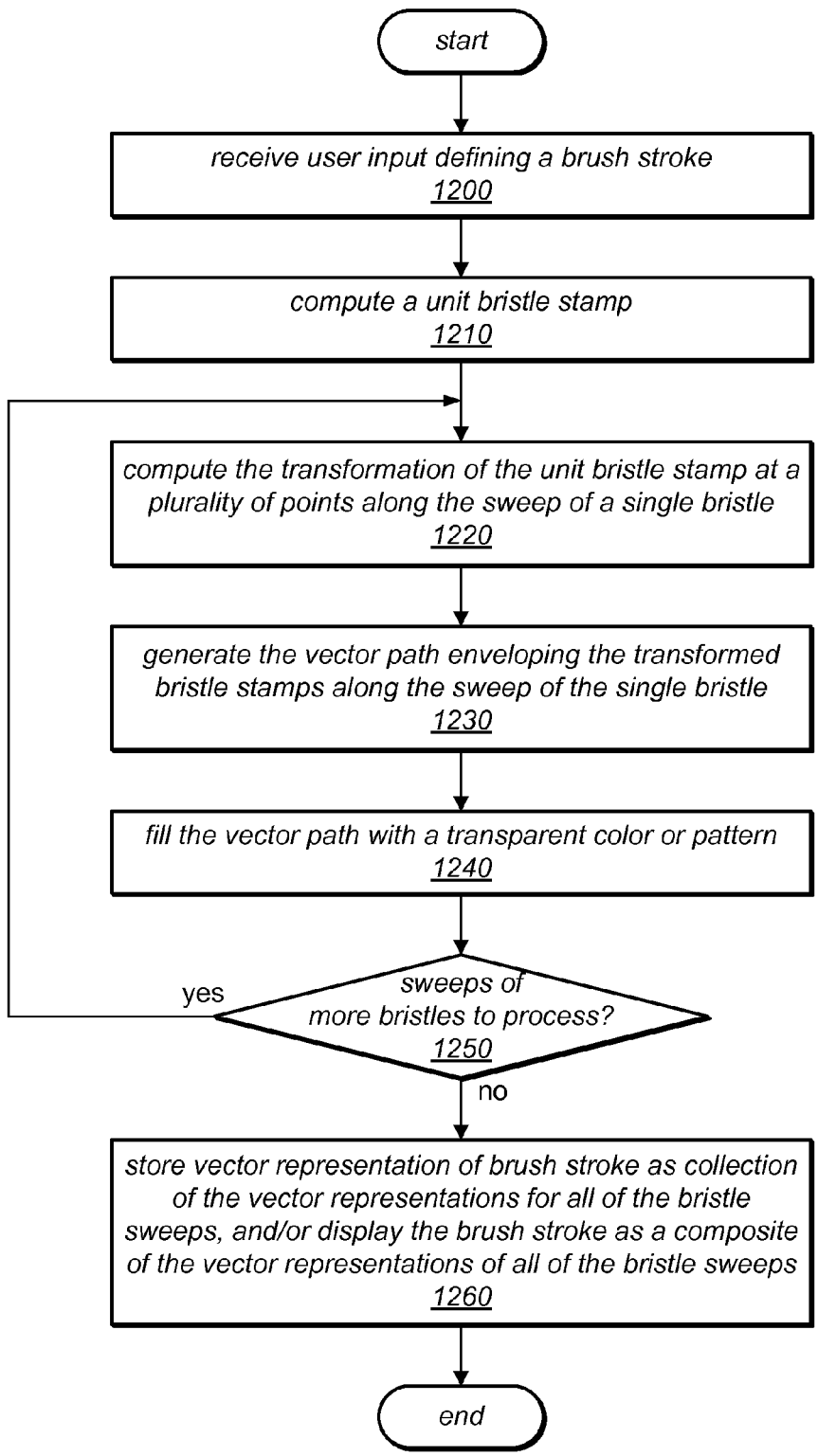
FIG. 12 is a flow diagram illustrating a method for generating a vector representation of a brush stroke, according to one embodiment.

As illustrated in this example, the method may also include generating a vector representation of the effect on the image produced by the brush bristles during the brush stroke, as in 730. One method for generating this vector representation is illustrated in FIG. 12 and described in detail herein. As with the simulation of the brush behavior, the computation of the vector representation of the brush stroke may be more computationally efficient if the generation of vector outputs representing the effects of each of the brush bristles are separated so they are independent of one another. The separation of the bristles permitted by the use of multiple brush handle bodies may permit the vector output for each bristle to be solved independently. Therefore, the vector output generation may be both computationally efficient and scalable in a multi-processor or multi-core environment. In one embodiment, for example, a vector representation of the effect of the stroke of a brush comprising 40 bristles may be generated at 60 Hz on one core; alternatively, a vector representation of the stroke of a brush comprising 75 bristles may be generated at 30 Hz on one core.

As shown in 740, the method may include modifying the image based on the determined effect of each of the plurality of bristle representations on the image throughout the motion, as described in detail above. For example, color values of pixels affected by the stroke of the brush may be modified. In one embodiment, each bristle representation in "contact" with the canvas may affect at least one pixel along its path from the first simulation step to the second simulation step.

Figure 8:
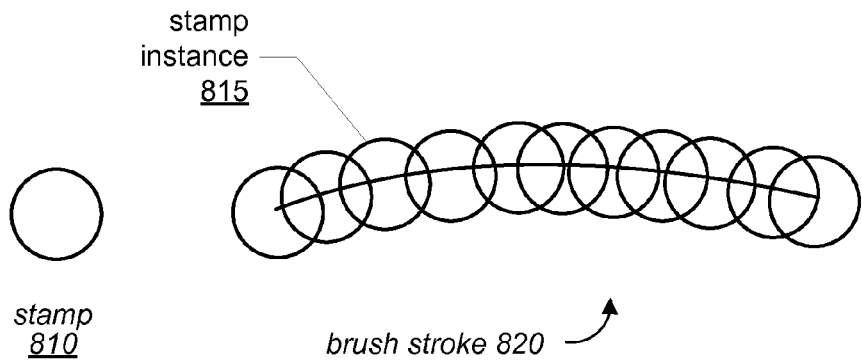
FIG. 8 illustrates the generation of a raster representation of a brush stroke from a stamp, according to one embodiment.

In a raster editing program such as Adobe Photoshop®, 2D swept areas of 2D shapes may be computed by repeatedly stamping the shape at a small translation increment. For sufficiently small increments, the result may be a smooth stroke. For example, FIG. 8 illustrates the generation of a raster representation of a brush stroke from a stamp, according to one embodiment. In this example, multiple instances of a stamp 810 (e.g., stamp instance 815) are translated and placed along a curved path to form a brush stroke 820.

Figure 9:
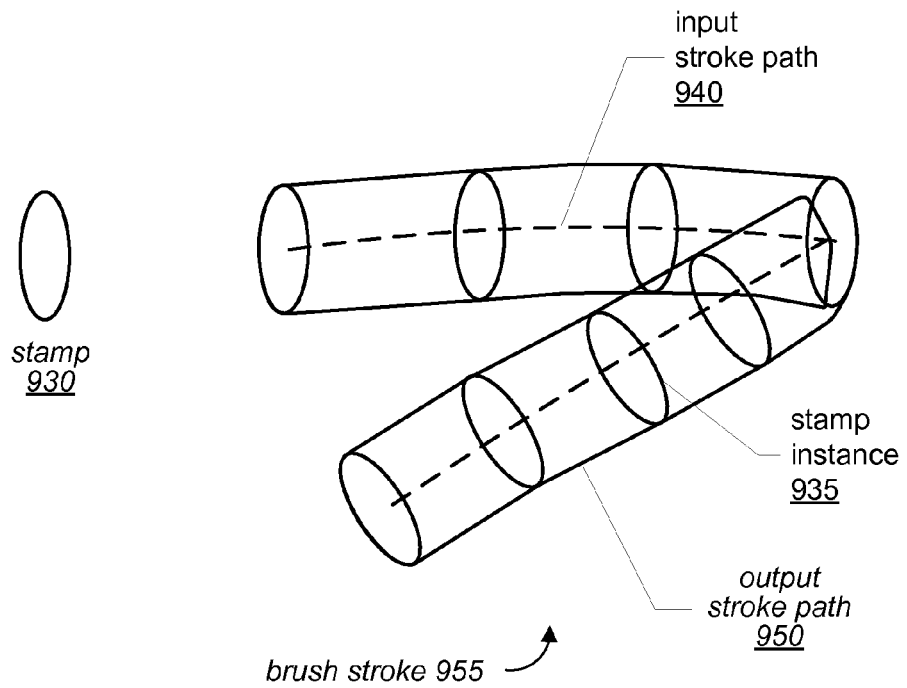
FIG. 9 illustrates the generation of a brush stroke path from vector stamps, according to one embodiment.

In some vector programs, such as Adobe Illustrator®, a calligraphic brush tool may work by taking a 2D brush shape and moving it along an input path. An advantage of the individual bristle model described herein is that it may enable vector output through bristle sweeping. A brush stroke may then be represented as a set of transparent filled vector outlines, called "sweeps", e.g., one per-bristle. A sweep may be generated by computing the envelope around the set of instantaneous 2D poses of a bristle over the stroke, as described in more detail below. A bristle's instantaneous 2D pose may in some embodiments be represented as an ellipse oriented so that its furthest points align with the two extreme points of the bristle's contact with the canvas (i.e. the bristle tip and the intersection with the deposition threshold). In this example, the minor axis of the ellipse may represent the bristle diameter. The envelope around these poses may in some embodiments be computed using established algorithms, such as those described below. For example, FIG. 9 illustrates a stamp 930 that is moved along an input stroke path 940 (depicted as a dashed line in FIG. 9). As described herein, each of these stamp instances (e.g., stamp instance 935) may be transformed (e.g., in length, shape, and/or rotated angle) to reflect the trajectory of the brush stroke and its properties. Once this set of stamp shapes is generated, the unified perimeter of the all the stamp shapes may be computed, and this becomes the output stroke path 950 of the brush stroke 955. Output stroke path 950 is illustrated in FIG. 9 as an envelope containing all of the instances of stamp 930 (i.e. stamp instances 935) placed along input stroke path 940.

As noted above, in some embodiments, the system described herein may be configured to generate vector output from data representing one or more bristle sweeps (i.e. according to a physical brush simulation) using any of a variety of techniques. For example, in some embodiments, a stroke outline may be computed from a brush outline and a trajectory. This stroke input data may be received from a brush tool in an image editing application and may be processed by another module or component of the image editing application, as described herein. As described herein, the system may be configured to compute a unit stamp and a plurality of transformations to be applied to that unit stamp at different points in the bristle sweep to represent a bristle sweep, and to pass data representing the unit stamp and the transformations thereof (e.g., scaling and/or rotations) as input to a component or module configured to generate a vector representation of the bristle sweep (e.g., a filled vector path). In various embodiments, the vector output generated to represent a brush may comprise a set of Bézier curves, straight line segments, or other vector elements that together represent the effect of each bristle as it sweeps across the canvas. In general, a vector representation of a brush stroke, or bristle sweep thereof, may comprise any analytical representation of a filled area, as opposed to a collection of pixel values for such an area (i.e. a raster representation of the area).

One method for generating a vector representation from brush stroke information is described in "Real Time Fitting of Hand-Sketched Pressure Brushstrokes", by Thierry Pudet, published in the proceedings of the European Computer Graphics Conference and Exhibition, Amsterdam, Netherlands, 1994 (Eurographics '94). This paper describes a method for fitting the outline of hand-sketched pressure brushstrokes with Bézier curves. The method combines a brush-trajectory model, in which a stroke is generated by dragging a brush along a given trajectory, with a fast curve-fitting algorithm. In Pudet's system, from a digitized trajectory followed by the stylus, its associated pressure data, and a specified brush, a stroke of variable width is computed and displayed in real time. More specifically, the digitized trajectory is fitted, thus removing noise. Next, from polygonal approximations of the fitted trajectory and the brush outline, a polygonal approximation of the stroke outline is computed. Finally, the polygonal approximation of the stroke outline is fitted. In Pudet's system, the result is a closed piecewise Bézier curve approximating the brushstroke outline to within an arbitrary error tolerance. Pudet's paper describes methods for brushstroke fitting applicable to rigid brushes and dynamic brushes.

Note that the methods described above for generating a filled vector path for a brush stroke may not be applicable in prior art systems that model a bristle brush as a single, large stamp (e.g., a single triangle mesh).

Figure 10:
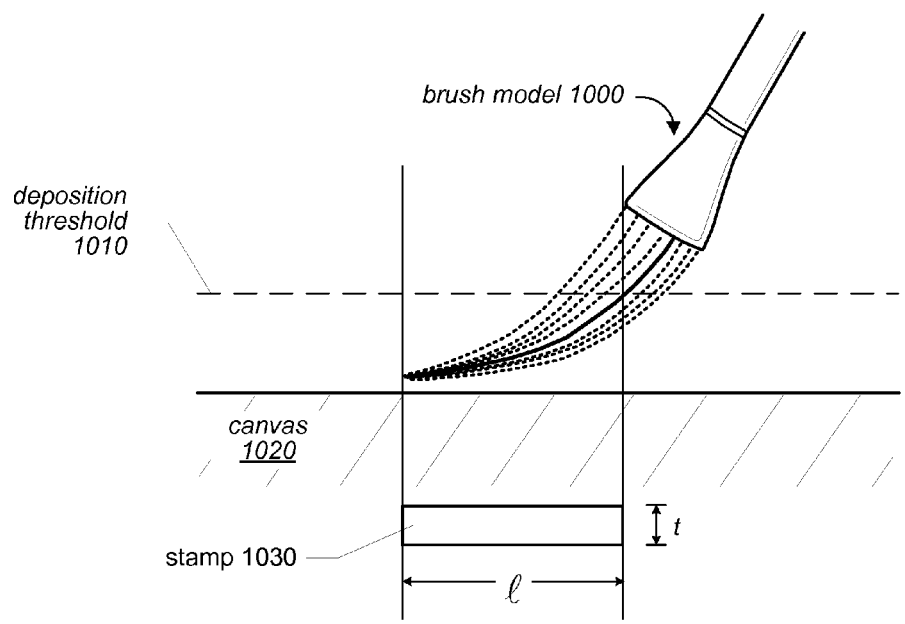
FIG. 10 illustrates the relationships between various models and parameters used in generating a vector representation of a brush stroke, according to one embodiment.
Figure 11:
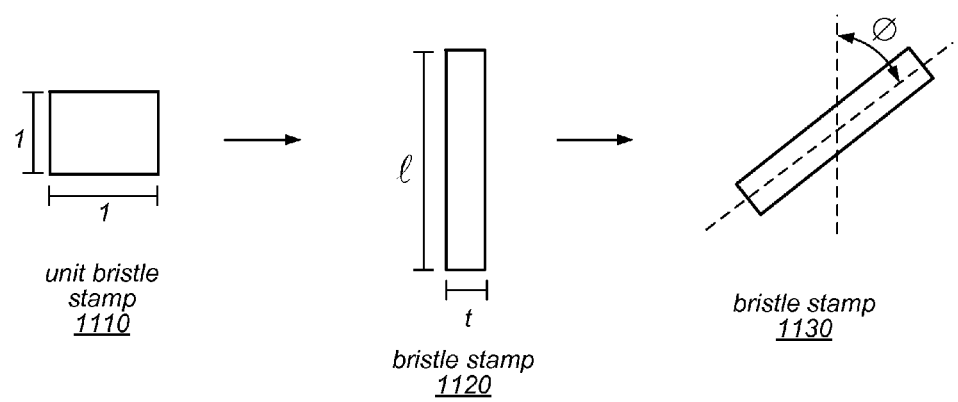
FIG. 11 illustrates a unit bristle stamp and various transformations of a unit bristle stamp that may be used in generating a vector representation of a brush stroke.

The system and methods described herein for generating a brush stroke path from vector stamps may be further illustrated by way of the following detailed example, and in reference to FIGS. 10 and 11. FIG. 10 illustrates the relationships between various models and parameters used in generating a vector representation of a brush stroke, according to one embodiment. FIG. 11 illustrates a unit bristle stamp, as well as various transformations of a unit bristle stamp that may be used in generating the vector representation of a brush stroke. As illustrated in this example, to generate a vector representation of the stroke path (or sweep) of a single bristle, a "unit bristle" stamp may be created that represents the stamp made by the tip of a single bristle. For example, in some embodiments, the unit bristle stamp may consist of a square with rounded corners. Such a stamp may be constructed using a set of Bézier curves that together form the unit stamp. One such unit bristle stamp is illustrated as 1110 in FIG. 11. In other embodiments, the unit bristle stamp may have a different shape (e.g., a circle, square, rectangle, hexagon, or any other simple or complex shape).

In this example, for each time step of the simulation of a brush stroke, the 3D position of the bristle may be used to find $l$, which represents the length of the bristle that is determined to be in "contact" with the canvas—that is, the portion of the bristle that is below the deposition threshold, where the deposition threshold may be defined as being at an arbitrary height above the canvas. This is illustrated in FIG. 10, in which the length l of stamp 1030 corresponds to the portion of a single bristle of brush model 1000 (the bristle shown as a solid line, in this example) that is between the deposition threshold 1010 and the canvas 1020. As illustrated in this example, the thickness t' of stamp 1030 may correspond to the thickness t of the single bristle. In other words, as illustrated in FIG. 11, at any given point along the sweep of a single bristle, the path of the bristle at that point may be represented by a unit bristle stamp 1110 that is stretched so that its width is equal to the bristle thickness t and its height is equal to the length l of the bristle that is considered to be "in contact" with the canvas. This is illustrated in FIG. 11 as bristle stamp 1120, which represents a unit bristle stamp 1110 that has been adjusted for thickness and length. Note that in some embodiments, the thickness of a bristle may be considered to be static during a stroke. In other words, unlike the shape and/or length of the bristle, the thickness may be based on a static property of the brush/bristle model and may not change during a given brush stroke. In this representation, the stamp may then be rotated by theta, which may correspond to the orientation of the bristle about the canvas' normal vector (i.e. if the observer is looking down at the canvas from above, this may represent the 2D rotation of the stamp). One such bristle stamp (i.e. a unit bristle stamp 1110 that has been adjusted for thickness and length, and then for orientation) is illustrated as bristle stamp 1130 in FIG. 11.

As previously noted, once a bristle's stamps are generated (i.e. once such unit bristle stamp transformations are generated for a plurality of points along the sweep of the bristle), the stroke path that envelopes the stamps may be computed using any of a variety of established techniques (such as those used by the calligraphic brush tool in Adobe Illustrator®), and the resulting vector representation may comprise one or more Bézier curves, non-uniform rational basis splines (NURBS), straight line segments, or any other suitable vector representation. In other words, in some embodiments, the analysis of the brush stroke and generation of a vector representation thereof may be performed subsequent to receiving brush stroke information for the entire brush stroke from the beginning of the stroke to the end of the stroke (e.g., from the point at which the user puts the stylus down on the canvas, or "mouses down", to the point at which the user picks the stylus up, or "mouse up"). When the transparent filled paths of each bristle are composited on top of one another, the final vector brush stroke is complete.

FIG. 12 is a flow diagram illustrating a method for generating a vector representation of a brush stroke, according to one embodiment. As illustrated in this example, the method may include receiving user input defining a brush stroke, as described herein. For example, a user may simulate a brush stroke using a stylus (or a pressure-sensitive stylus), a digitizing tablet, a mouse, or another type of input device, and may specify a type of brush, a thickness of the brush, a color or texture to be applied using the brush, an orientation of the brush during the stroke (and/or various portions thereof), an amount of "paint" to be applied to a "canvas" during the stroke, and/or an amount of "pressure" to be applied to the brush during the brush stroke in addition to defining the motion of the brush stroke. The method may include computing a unit bristle stamp, as in 1210. As described above, in various embodiments, a unit bristle stamp may consist of any arbitrary shape having a unit length and height (e.g., according to an arbitrary resolution of the initial computation). In some embodiments, the shape of the unit bristle stamp used to generate a vector representation of each bristle of a brush tool may be the same. In other embodiments (e.g., those in which a bristle brush modeled in the system comprises a collection of differently-shaped bristles), two or more of the bristles of the brush tool may be modeled using unit bristle stamps having different shapes. In such embodiments, a different unit bristle stamp may need to be computed for at least some of the bristles. In these cases, the method illustrated in FIG. 12 may be modified such that the positive exit from element 1250 in FIG. 12 loops back to element 1210 (rather than to element 1220) when the next bristle to be processed has a different shape than the bristle that has just been processed (not shown).

In this example, the method may include computing the transformation of the unit bristle stamp at a plurality of points along the sweep of a single bristle of the brush, as in 1220. For example, at each of a plurality of stamping points along the sweep of a the bristle, the length and/or thickness of the unit bristle stamp may be modified to match the length/and/or thickness t of the bristle at that point, as described above. In addition, the orientation of the stamp may be modified dependent on an orientation defined by the user input (e.g., the orientation of a stylus or other input device, or an orientation specified using any of a variety of input mechanisms). Data representing each of the transformed stamps and their absolute and/or relative positions may be stored as intermediate data for the generation of a vector representation of the bristle sweep and/or the brush stroke, in various embodiments.

As illustrated at 1230 in FIG. 12, the method may include generating the vector path enveloping the transformed bristle stamps along the sweep of the single bristle. In this example, this vector path may then be filled with a transparent color or pattern (e.g., if the image editing application supports the "painting" of patterns and/or texture information using a brush tool), as in 1240. For example, in some embodiments, the user input defining the brush stroke may include data indicating the color, pattern, or texture to be applied, an opacity of the color, pattern, or texture to be applied by the brush stroke, or other information from which a fill color or pattern may be computed and added to the vector representation of the output path of the sweep of the single bristle. In other embodiments, data specifying the color, pattern, or texture to be applied by the brush stroke may be received from a component or module of the image editing application other than that which supplies the brush stroke motion information and/or information about the brush model to be simulated (e.g., the brush type, brush size, number of bristles, bristle shape, bristle thickness, etc.)

If there are additional brush bristles for which a vector representation has not yet been generated, shown as the positive exit from 1250, the method may include repeating the operations illustrated in 1220-1240 of FIG. 12 for each of these additional bristles. This is shown as the feedback from 1250 to 1220. If there are no other bristle sweeps to be processed, shown as the negative exit from 1250, the method may include storing a vector representation of the brush stroke as a collection of the vector representations generated for all of the individual bristle sweeps, as in 1260. As shown in this example, the method may include displaying the brush stroke by compositing the vector representations of all of the bristle sweeps (i.e. overlaying the transparently filled output vector paths on top of each other to represent the effect of the bristle brush stroke on the canvas).

Figure 13:
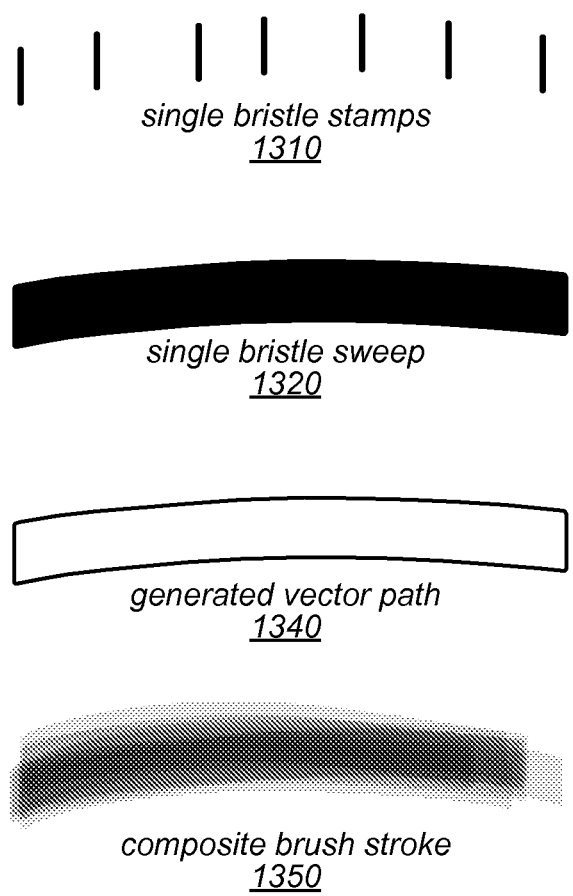
FIG. 13 illustrates the generation of a brush stroke comprising ten bristles, according to one embodiment.

FIG. 13 illustrates the generation of a brush stroke comprising ten bristles, according to one embodiment. In this example, seven bristle stamps, shown in 1310, are input to represent a single bristle sweep 1320. A vector path 1340 for the single bristle sweep is generated from the collection of seven bristle stamps using the system and methods described herein. In this example, a vector representation of the entire brush stroke may be displayed by compositing the vector representation of the single bristle sweep 1320 along with respective vector representations of nine other bristle sweeps for the same brush stroke. The composite brush stroke, comprising a respective transparent filled path for the sweep of each of the ten bristles, is illustrated in 1350. While the seven bristle stamps shown in 1310 appear to be the same size and appear to have the same orientation, in this example, it may be understood that these stamps may typically be transformed (e.g., in length, shape, and/or rotated angle) to reflect the trajectory of the brush stroke and its properties (as described herein). For example, for the single bristle sweep 1320 illustrated in FIG. 13, the bristle stamps in the middle of the sweep may be taller/longer than those at the beginning or end of the sweep, since more of the bristle may be in contact with the canvas in the middle of a brush stroke than when first putting the brush to canvas or lifting it up again.

In some embodiments, the performance of the system when generating a vector representation of a brush stroke may be highly dependent on the number of bristle stamp transformations used to define each bristle sweep. Therefore, the system described herein may be configured to determine and generate an appropriate number of stamps along the input path to maximize performance while faithfully representing the input stroke path. For example, a calligraphic brush tool may produce stamps using a tight, constant spacing, since the stamp shape may be static and, thus, may not generate undue processor burden. However, the simulation of bristle tips may be significantly more complex and may require more processing time per-stamp. Therefore, the system may be configured to choose more optimized placements and to use fewer overall stamps to simulate each bristle sweep. Simply lowering the number of stamps while retaining a constant spacing may result in high frequency features like corners being truncated or missed entirely. Therefore, the system described herein may be configured to adaptively space stamps based on the curvature of the input path, e.g., using a recursive subdivision scheme. For example, in order to generate a realistic looking result, the code that generates an output vector path from input stroke/bristle path data may require input data for a larger collection of stamps along portions of the input path corresponding to areas of high curvature (e.g., corners and curve segments) than in portions of the input path corresponding to straight line segments, or nearly straight segments. In some embodiments, for a straight line segment within the input path, it may only be necessary to compute a transformed unit stamp for the beginning and end of the segment, for example.

In some embodiments, for an input path segment having bristle stamps at the beginning and end, to determine if more stamps are needed, the distance may be computed between the midpoint of the path segment and the midpoint of a straight line drawn between its endpoints. If the distance is greater than a given (i.e. predetermined) threshold, a new stamp may be created in the middle of the segment, and the process may be repeated. Using this method, large straight regions may be represented by only a few stamps, but tight corners may be represented using proportionally more stamps. Placing a large number of stamps along the path only where they are needed to define the path may result in an overall reduction in the number of stamps that must be processed in order to generate vector output for each bristle stroke, and thus may result in a significant performance improvement without sacrificing output quality. The use of a smaller number of samples to produce the vector representation in such an adaptive approach may in some embodiments also produce a more compact vector representation of the brush stroke and/or the bristle sweeps thereof.

Figure 14:
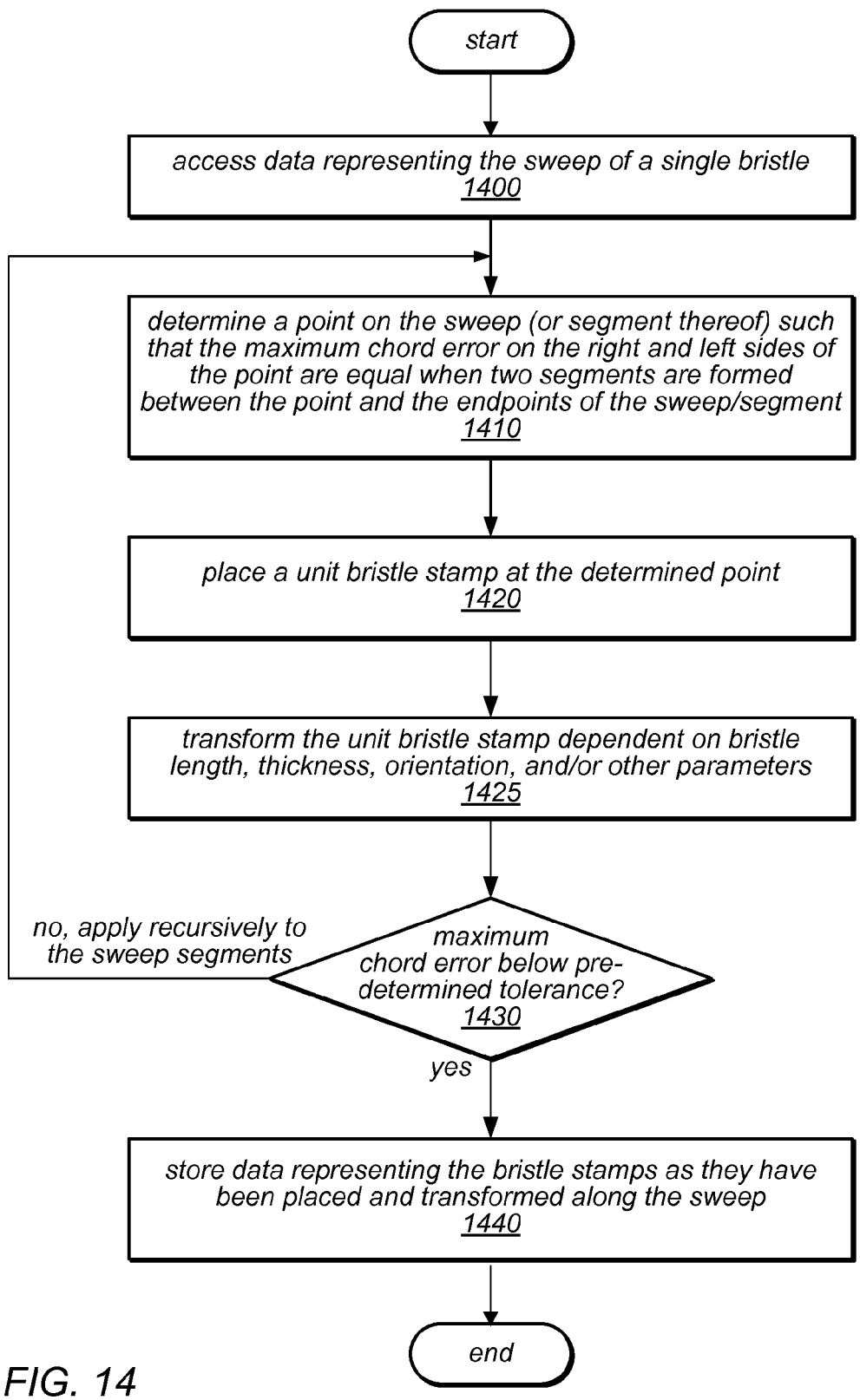
FIG. 14 is a flow diagram illustrating a method for adaptively spacing bristle stamps along the sweep of a single bristle, according to one embodiment.

FIG. 14 is a flow diagram illustrating a method for adaptively spacing bristle stamps along the sweep of a single bristle, according to one embodiment. As shown in this example, the method may include accessing data representing at least a portion of the sweep of a single brush bristle, as in 1400. The input data may also represent one segment of a bristle sweep that has already been subdivided (e.g., by a previous iteration in a recursive application of the method illustrated in FIG. 14).

As shown in 1410 of FIG. 14, the method may include determining a point on the sweep (or a segment thereof) such that the maximum chord error on the right and left sides of the point are equal when respective segments are formed between the point and the two endpoints of the sweep (or segment thereof). This point may correspond to a particular value of a curve parameter defining the sweep. Any of a variety of methods may be used to determine this curve parameter, according to different embodiments, including one described in co-pending U.S. patent application Ser. No. 12/541,090, entitled "System and Method for Approximating Parametric Curves Using Optimal Number of Segments", filed on Aug. 13, 2009, and naming Eric Vinchon as inventor. As shown in this example, the method may include placing a unit bristle stamp, effectively dividing the sweep (or portion thereof) into two segments, at the determined subdivision point. This is illustrated as 1420 in FIG. 14. As illustrated at 1425, the transformation of the unit bristle stamp may then be computed dependent on the bristle length l, bristle thickness t, bristle orientation, and/or other parameters of the brush model or bristle thereof (e.g., the brush type, number of bristles, spacing of bristles, stiffness of bristles, shape of each bristle, shape of the brush tip) and/or on other received or stored data, as described herein.

As illustrated in FIG. 14, the method may include determining whether the maximum chord error following the insertion of stamp at the determined point is less than a given pre-determined error tolerance, as in 1430. For example, in some embodiments, the error tolerance may be a default error tolerance or user-configurable (i.e. user-specified) error tolerance. In other embodiments, the error tolerance may be an application-specific error tolerance, since the suitability of the spacing of the stamps along a sweep may be dependent on how the generated vector representation will be used. For example, if the vector representation will be visually displayed to a user in a relatively low-resolution application, the acceptable error may be higher than if the vector representation will be used to make precise calculations (e.g., for measurements, complex editing operations, etc.).

If the maximum error following the insertion of the stamp at the determined subdivision point is not less than the specified error tolerance, the method may include recursively applying the operations illustrated in 1410 and 1420 to each (i.e. both) of the two segments produced by subdividing the sweep (or segment thereof) at the determined point to further divide these two sweep segments. This is illustrated in FIG. 14 as the feedback from the negative exit from 1430 to 1410. Note that because the method described herein determines the subdivision point at which the maximum distances between the sweep and segments approximating the sweep on each side of the point are equal, these operations will always be applied recursively to both of the resulting segments or to neither of them.

If the maximum error is less than the specified error tolerance, shown as the positive exit from 1430, the method may include storing data representing the stamps as they have been transformed and placed along sweep, as in 1440. In various embodiments, such data may be stored in a data structure or file, according to various graphics formats, for later use. In some embodiments, rather than storing such data after all of the subdivision points, sweep segments, and/or transformed bristle stamps have been determined, data indicating the placement and/or transformation of a bristle stamp at each subdivision point (or any other intermediate data) may be stored as is it calculated (not shown).

The operations illustrated in FIG. 14 may be implemented using any of various mathematical algorithms for calculating the curve parameters corresponding to suitable subdivision points. For example, different mathematical algorithms may be applied to the calculations in different embodiments, as long as subdivision points are inserted at curve parameters such that, once inserted, the maximal errors on the left and the right sides of each subdivision point are equal.

Figure 15A:
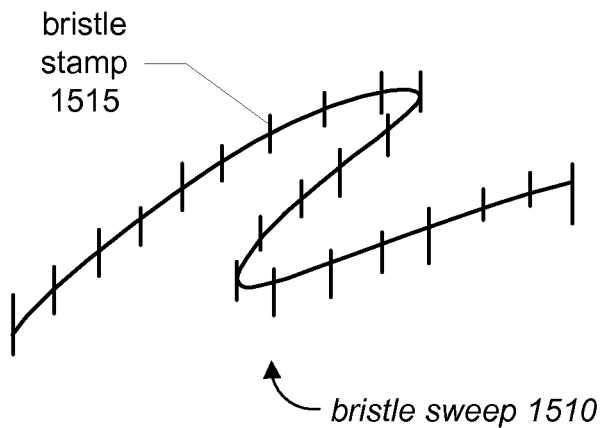
FIGS. 15A and 15B illustrate the placing of bristle stamps along the sweep of a single bristle, according to various embodiments.
Figure 15B:
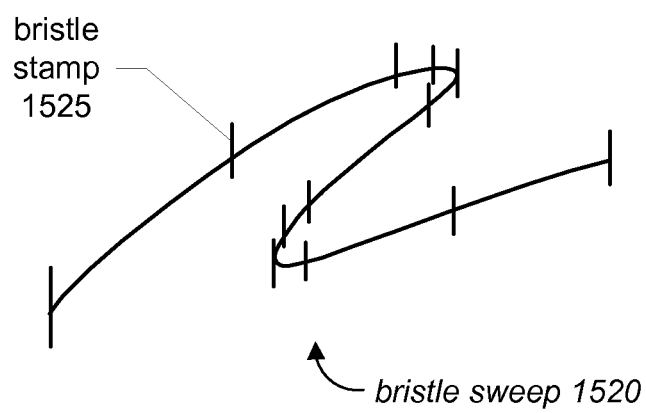

FIGS. 15A and 15B illustrate the placing of bristle stamps along the sweep of a single bristle, according to various embodiments. FIG. 15A illustrates an example in which 22 bristle stamps (e.g., bristle stamp 1515) have been placed along the sweep of a single bristle (bristle sweep 1510) using a constant spacing between the bristle stamps. FIG. 15B illustrates an example in which 12 bristle stamps (e.g., bristle stamp 1525) have been placed along a similar sweep of a single bristle (bristle sweep 1520) using adaptive spacing between the bristle stamps, as described above.

The system and methods described herein employ a novel 3D brush model that represents individual bristles at a significantly faster speed and with a greater degree of flexibility than previous work. The system may in various embodiments support arbitrary 3D brush shapes with fully dynamic splitting behaviors. The model employs associated stroke generation algorithms that work for both raster and vector output, and a bi-directional paint transfer mechanism to recreate a number of important natural media painting effects.

The methods described herein have been integrated into systems supporting various commercial painting products, including raster-based products and vector-based products, demonstrating the model's robustness to real-world industry demands. Professional artists have successfully used these tools to create a wide variety of different styles of artwork, all with the feeling of natural media paintings. Notably, the vector output has enabled a degree of texture and stylization that has not been seen before in vector painting applications. During these evaluations, tools employing the methods described herein were able to keep up with the rigorous demands of professional users, across all of their different workflows.

In some embodiments, performance of the model described herein may be improved by integrating GPU acceleration for the rasterization and compositing operations described. This may result in an additional leap in performance, especially when employing models of large brushes (e.g., those having a large footprint and/or a large number of bristles).

Figure 16:
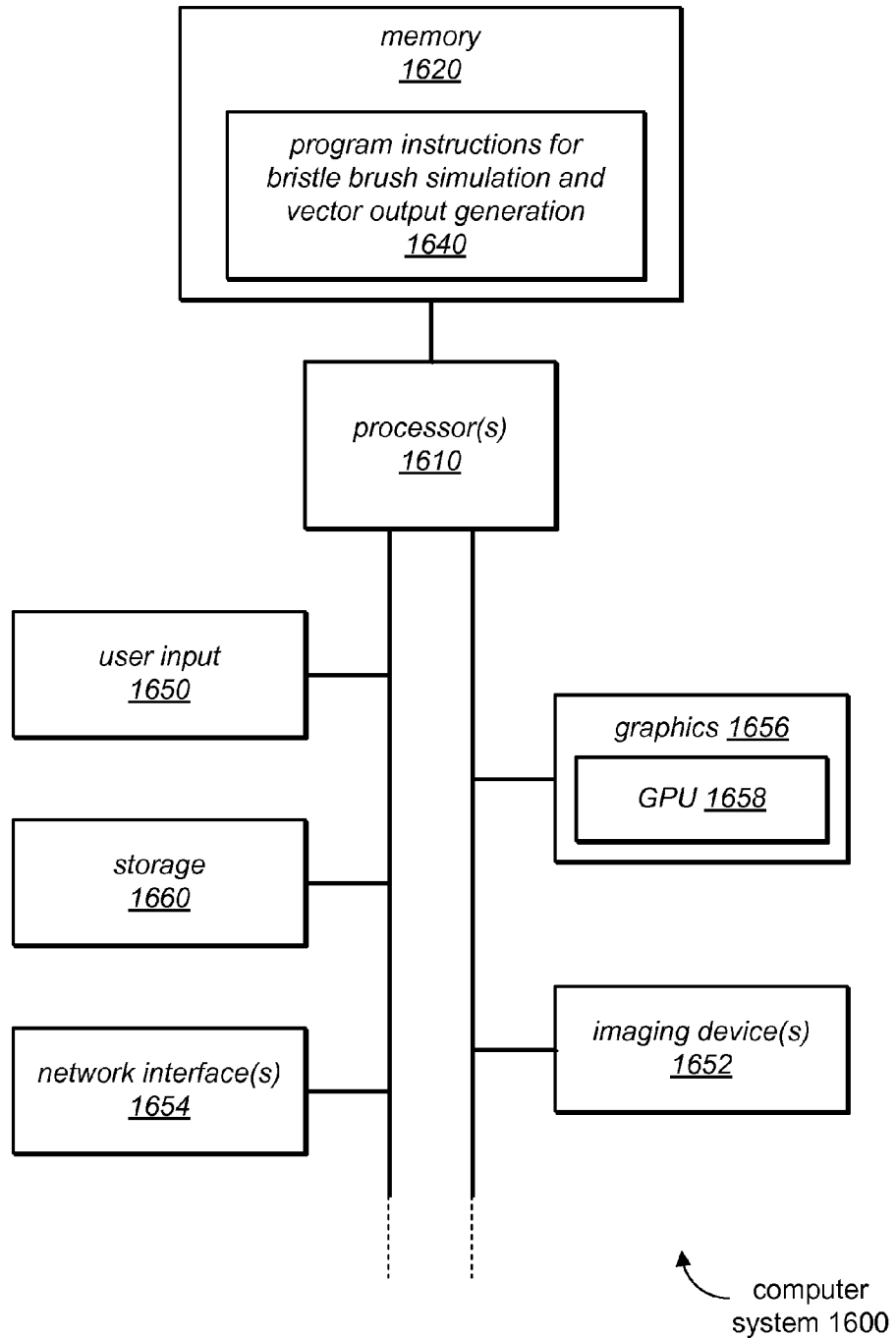
FIG. 16 is a block diagram illustrating constituent elements of a computer system that is configured to implement brush simulation and generation of vector representations of brush strokes, according to various embodiments.

FIG. 16 is a block diagram illustrating constituent elements of a computer system 1600 that is configured to implement embodiments of the systems and methods described herein. The computer system 1600 may include one or more processors 1610 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 1600, such as various versions of Unix, Linux, Windows® from Microsoft Corporation, MacOS® from Apple Inc., or any other operating system that enables the operation of software on a hardware platform. The processor(s) 1610 may be coupled to one or more of the other illustrated components, such as a memory 1620, by at least one communications bus.

In one embodiment, a specialized graphics card or other graphics component 1656 may be coupled to the processor(s) 1610. The graphics component 1656 may include a graphics processing unit (GPU) 1658. Additionally, the computer system 1600 may include one or more imaging devices 1652. The one or more imaging devices 1652 may include various types of raster-based imaging devices such as monitors and printers. In one embodiment, one or more display devices 1652 may be coupled to the graphics component 1656 for display of data provided by the graphics component 1656.

In one embodiment, program instructions 1640 that may be executable by the processor(s) 1610 to implement aspects of the techniques described herein (e.g., program instructions executable to cause computer system 1600 to perform bristle brush simulation and/or generation of vector output from such a simulation) may be partly or fully resident within the memory 1620 at the computer system 1600 at any point in time. For example, portions of the digital image editing program 100 and its constituent elements and data (e.g., editing operations 120, brush model 130, and/or brush behavior simulation functionality 140) and/or program instructions executable to generate vector output from a simulation of a bristle brush may be stored in the memory 1620. The memory 1620 may be implemented using any appropriate medium such as any of various types of ROM or RAM (e.g., DRAM, SDRAM, RDRAM, SRAM, etc.), or combinations thereof. The program instructions may also be stored on a storage device 1660 accessible from the processor(s) 1610. Any of a variety of storage devices 1660 may be used to store the program instructions 1640 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 1660 may be coupled to the processor(s) 1610 through one or more storage or I/O interfaces. In some embodiments, the program instructions 1640 may be provided to the computer system 1600 via any suitable computer-readable storage medium including the memory 1620 and storage devices 1660 described above.

The computer system 1600 may also include one or more additional I/O interfaces, such as interfaces for one or more user input devices 1650. In addition, the computer system 1600 may include one or more network interfaces 1654 providing access to a network. It should be noted that one or more components of the computer system 1600 may be located remotely and accessed via the network. The program instructions may be implemented in various embodiments using any desired programming language, scripting language, or combination of programming languages and/or scripting languages, e.g., C, C++, C#, Java™, Perl, etc. The computer system 1600 may also include numerous elements not shown in FIG. 16, as illustrated by the ellipsis.

In various embodiments, the elements shown in various flow diagrams (e.g., FIGS. 6, 7, 12, and 14) may be performed in a different order than the illustrated order. In these figures, any of the operations described in the elements may be performed programmatically (i.e., by a computer according to a computer program). In these figures, any of the operations described in the elements may be performed automatically (i.e., without user intervention).

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A method, comprising:
executing an image editor on a processor of a computer to perform:
receiving a brush stroke input made by a brush tool comprising a plurality of bristles sweeping across a canvas;
determining a path for each bristle along which said each bristle sweeps across the canvas;
generating a bristle vector representation of each path for said each bristle, the bristle vector representation of a bristle generated from a transformation of unit bristle stamp instances that each represent a shape made by the tip of the bristle on the canvas;
determining at least one of a fill color and pattern to fill-in an outline of the unit bristle stamp instances along the path for said each bristle;
storing the at least one fill color and pattern in the bristle vector representation for said each bristle; and
generating a vector representation of effects of the brush stroke based on the bristle vector representations for each of the plurality of the bristles of the brush tool.

2. The method of claim 1, wherein said generating the bristle vector representation of the path for a bristle comprises computing a unit bristle stamp that represents the shape of a stamp made by the tip of the bristle on the canvas.

3. The method of claim 2, wherein said generating the bristle vector representation of the path for the bristle further comprises computing the transformation of the unit bristle stamp for each of the unit bristle stamp instances along the path.

4. The method of claim 3, wherein said generating the bristle vector representation of the path for the bristle further comprises:
computing the outline that envelopes the unit bristle stamp instances along the path for said each bristle.

5. The method of claim 3, wherein said computing the transformation of the unit bristle stamp for each of the plurality of unit bristle stamp instances along the path comprises determining a minimum number of the unit bristle stamp instances to approximate the path within a pre-determined error tolerance.

6. The method of claim 3, wherein said computing the transformation of the unit bristle stamp is dependent on at least one of a thickness of the bristle, a portion of the bristle that is in contact with the canvas, and an orientation of the brush tool.

7. The method of claim 2, wherein the unit bristle stamp represents at least two of the plurality of the bristles that each have different shapes.

8. The method of claim 1, wherein each of the bristle vector representations of the paths for said each of the bristles comprises at least one of Bezier curves, non-uniform rational basis splines (NURBS), or straight line segments.

9. A non-transitory computer-readable storage medium, comprising stored program instructions that are executable and, responsive to execution of the program instructions by a process of a computer, the computer performs:
receiving a brush stroke input made by a brush tool comprising a plurality of bristles sweeping across a canvas;
determining a path for each bristle along which said each bristle sweeps across the canvas;
generating a bristle vector representation of each path for said each bristle; and
generating a vector representation of effects of the brush stroke based on the bristle vector representations for each of the plurality of the bristles of the brush tool.

10. The storage medium of claim 9, wherein said generating the bristle vector representation of the path for a bristle comprises computing a unit bristle stamp that represents a shape made by the tip of the bristle on the canvas.

11. The storage medium of claim 10, wherein said generating the bristle vector representation of the path for the bristle further comprises computing a transformation of the unit bristle stamp for each of a plurality of unit bristle stamp instances along the path, and wherein the transformation is dependent on at least one of a thickness of the bristle, a portion of the bristle that is in contact with the canvas, and an orientation of the brush tool.

12. The storage medium of claim 11, wherein said generating the bristle vector representation of the path for the bristle further comprises:
computing an outline that envelopes the plurality of unit bristle stamp instances along the path; and
filling in the outline to produce a filled vector representation of the path along which the bristle sweeps across the canvas.

13. The storage medium of claim 12, wherein said filling m the outline comprises:
determining a transparent color or fill pattern for the path along which the bristle sweeps across the canvas; and
storing information indicating the transparent color or fill pattern in the bristle vector representation of the path.

14. The storage medium of claim 11, wherein said computing the transformation of the unit bristle stamp for each of the plurality of unit bristle stamp instances along the path comprises determining a minimum number of the unit bristle stamp instances to approximate the path within a pre-determined error tolerance.

15. A system, comprising:
a memory coupled one or more processors to implement an image editor that is configured to:
receive a brush stroke input made by a brush tool comprising a plurality of bristles sweeping across a canvas;
determine a path for each bristle along which said each bristle sweeps across the canvas;
generate a bristle vector representation of each path for said each bristle; and
generate a vector representation of effects of the brush stroke based on the bristle vector representations for each of the plurality of the bristles of the brush tool.

16. The system of claim 15, wherein, to generate the bristle vector representation of the path for a bristle, the image editor is configured to compute a unit bristle stamp that represents a shape made by the tip of the bristle on the canvas.

17. The system of claim 16, wherein, to generate the bristle vector representation of the path for the bristle, the image editor is configured to compute a transformation of the unit bristle stamp for each of a plurality of unit bristle stamp instances along the path, and wherein the transformation is dependent on at least one of a thickness of the bristle, a portion of the bristle that is in contact with the canvas, and an orientation of the brush tool.

18. The system of claim 17, wherein, to generate the bristle vector representation of the path for the bristle, the image editor is configured to:
compute an outline that envelopes the plurality of unit bristle stamp instances along the path;
fill-in the outline with a transparent color or fill pattern to produce a filled vector representation of the path along which the bristle sweeps across the canvas; and store information indicating the transparent color or fill pattern in the bristle vector representation of the path.

19. The system of claim 17, wherein, to compute the transformation of the unit bristle stamp for each of the plurality of unit bristle stamp instances along the path, the image editor is configured to determine a minimum number of the unit bristle stamp instances to approximate the path within a pre-determined error tolerance.

* * * * *

UNITED STATES PATENT AND TRADEMARK OFFICE
CERTIFICATE OF CORRECTION

PATENT NO. : 8,605,095 B2
APPLICATION NO. : 12/790581
DATED : December 10, 2013
INVENTOR(S) : Stephen J. DiVerdi et al.

Page 1 of 1

It is certified that error appears in the above-identified patent and that said Letters Patent is hereby corrected as shown below:

In the Claims:

Column 19, Lines 28 and 29, between "...the shape" and "made by...", delete "of a stamp", therefor.

Column 20, Line 24, after "filling", delete "m" and insert -- in --, therefor.

Column 20, Line 37, between "coupled" and "one", insert -- to --, therefor.

Signed and Sealed this
Fifteenth Day of April, 2014

Michelle K. Lee
*Deputy Director of the United States Patent and Trademark Office*